United States Patent
Britten et al.

(10) Patent No.: US 6,892,355 B2
(45) Date of Patent: May 10, 2005

(54) SYSTEM AND METHOD FOR INTERACTIVELY DESIGNING AND PRODUCING CUSTOMIZED ADVERTISING BANNERS

(75) Inventors: Paul J. Britten, Traverse City, MI (US); Tom Barrons, Traverse City, MI (US); Tim Barrons, Traverse City, MI (US)

(73) Assignee: BannerGalaxy.com, L.L.C., Traverse City, MI (US)

( * ) Notice: Subject to any disclaimer, the term of this patent is extended or adjusted under 35 U.S.C. 154(b) by 10 days.

(21) Appl. No.: 10/011,536

(22) Filed: Oct. 30, 2001

(65) Prior Publication Data

US 2002/0191010 A1 Dec. 19, 2002

Related U.S. Application Data

(60) Provisional application No. 60/297,947, filed on Jun. 13, 2001.

(51) Int. Cl.[7] ............................................. G06F 3/00
(52) U.S. Cl. .................................................. 715/733
(58) Field of Search ............................. 365/428, 629, 365/634, 636, 641, 731, 733, 740, 760, 764; 358/1.15, 1.18; 707/201, 203, 217, 219, 10; 709/201, 206, 217, 219; 715/517, 522, 526, 527, 530, 513

(56) References Cited

U.S. PATENT DOCUMENTS

| | | | |
|---|---|---|---|
| 5,544,291 A | * | 8/1996 | Gilley et al. ................. 345/423 |
| 5,724,070 A | * | 3/1998 | Denninghoff et al. ....... 345/547 |
| 5,911,145 A | | 6/1999 | Arora et al. |
| 6,011,537 A | | 1/2000 | Slotznick |
| 6,069,637 A | * | 5/2000 | Gaglione et al. ........... 345/629 |
| 6,128,655 A | | 10/2000 | Fields et al. |
| 6,128,663 A | | 10/2000 | Thomas |
| 6,185,589 B1 | * | 2/2001 | Votipka ...................... 715/517 |
| 6,243,104 B1 | | 6/2001 | Murray |
| 6,295,061 B1 | | 9/2001 | Park et al. |
| 6,332,146 B1 | * | 12/2001 | Jebens et al. ............. 707/104.1 |
| 6,404,441 B1 | * | 6/2002 | Chailleux ................... 345/704 |
| 6,563,504 B1 | * | 5/2003 | Rose et al. ................. 345/473 |

* cited by examiner

*Primary Examiner*—X. L. Bautista
(74) *Attorney, Agent, or Firm*—Harness, Dickey & Pierce, P.L.C.

(57) ABSTRACT

A computer-implemented system is provided for designing and producing customized display articles. The system generally includes at least one user interface, an applications server, a storage medium, a low-resolution graphics engine, a high-resolution graphics engine and an output subsystem. The user interface displays a customizable display article to a customer as well as captures information relating to the customization of the display article from the customer. The storage medium stores the customized data for the display article. In operation, the applications server manages the customization of the display article. The low-resolution graphics engine builds a low resolution representation of the display article which is displayed on and used to facilitate the customization of the display article at the user interface. After the customer has customized the display article, the high-resolution graphics engine builds a high-resolution representation of the display article which is used by the output subsystem to generate the customized display article onto the appropriate medium.

14 Claims, 5 Drawing Sheets

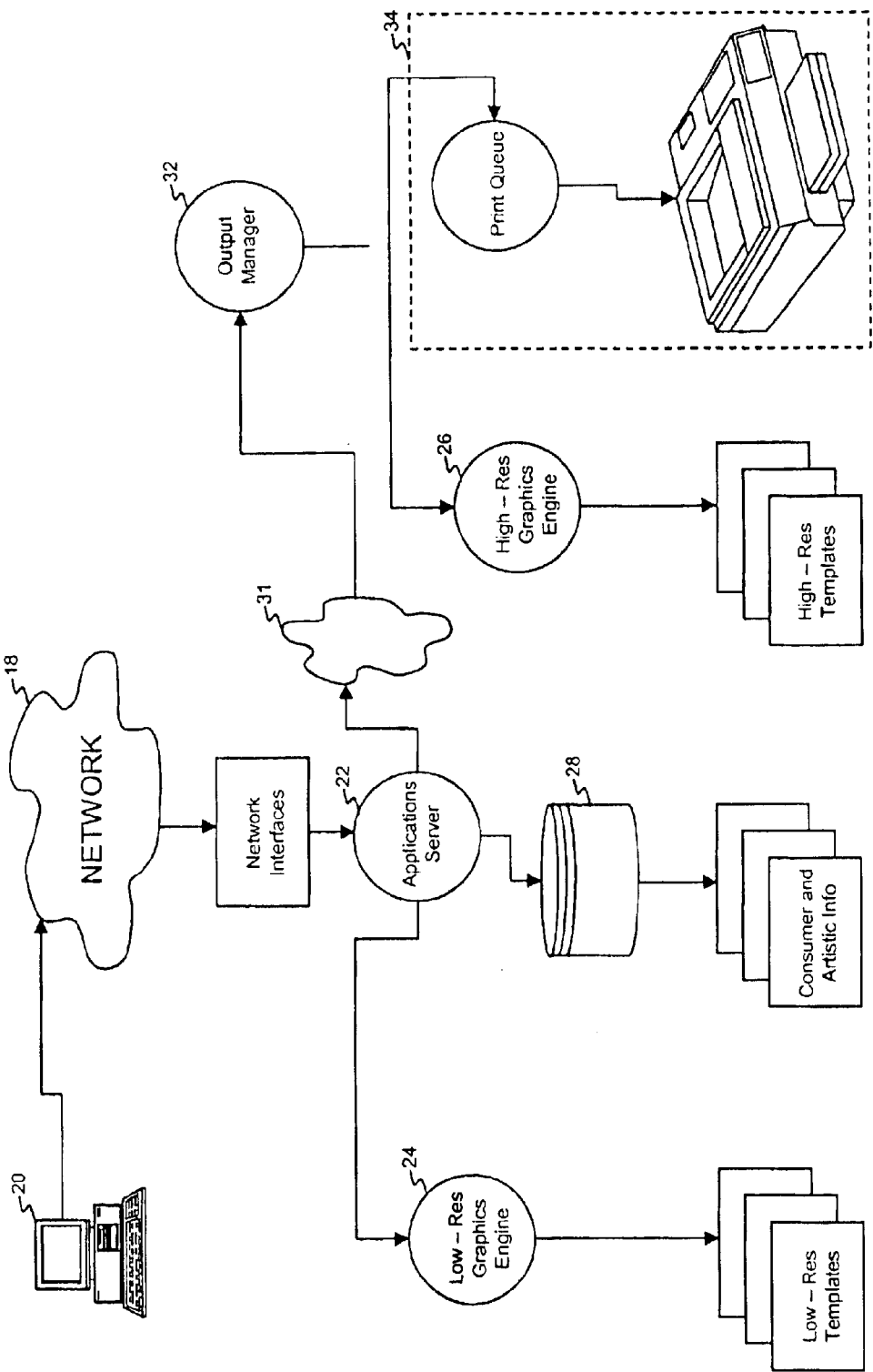

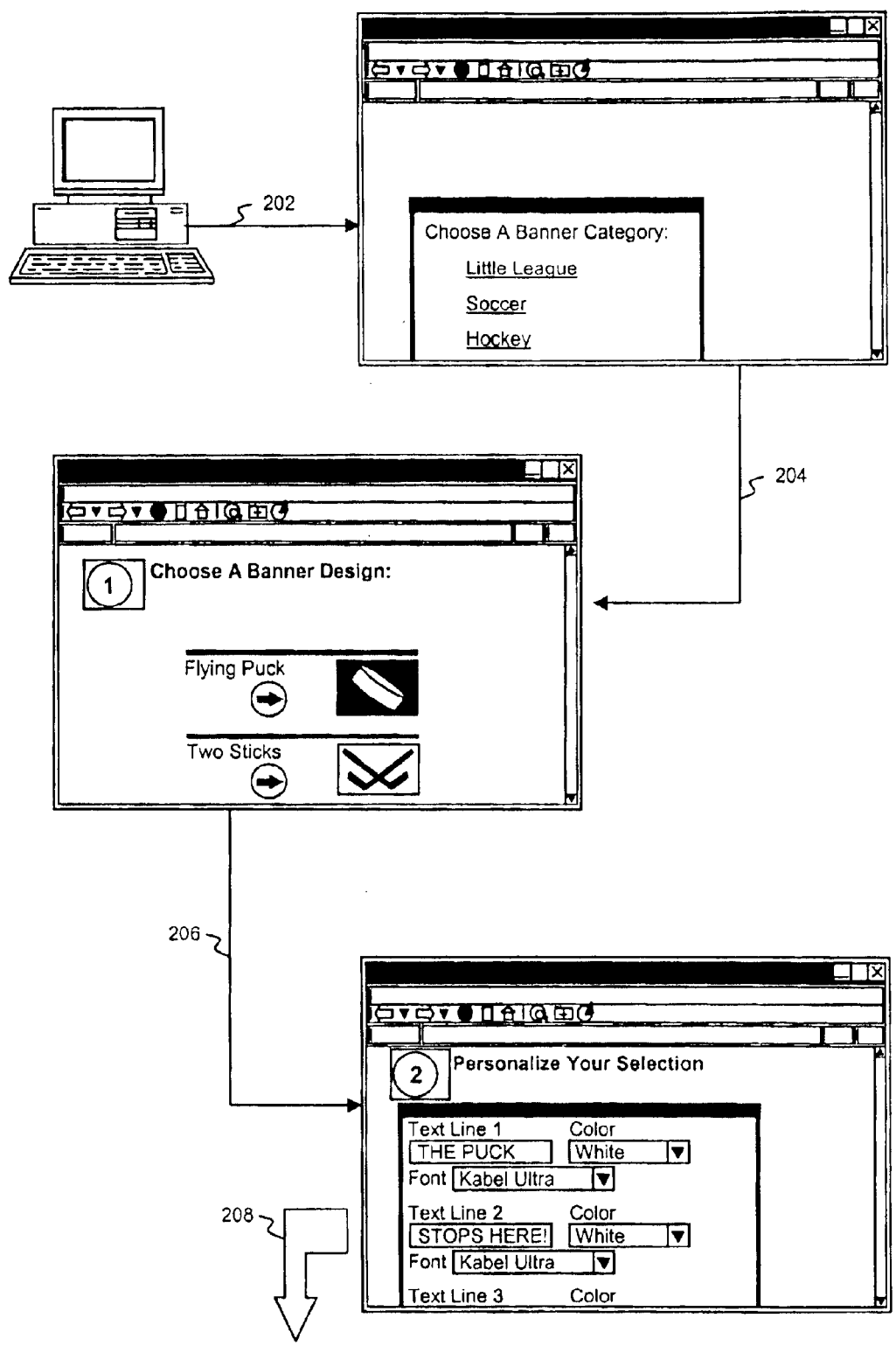

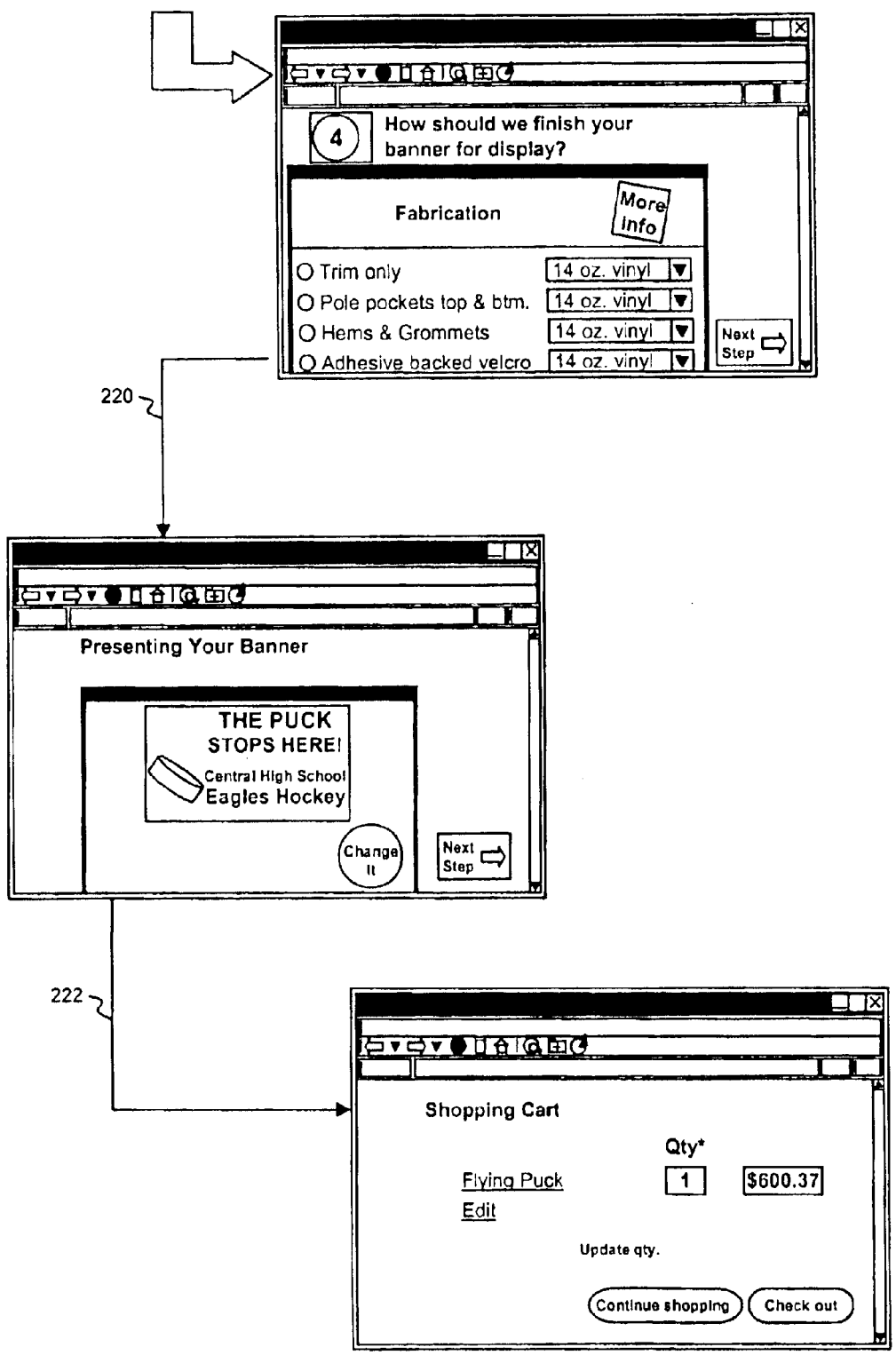

SYSTEM AND METHOD FOR INTERACTIVELY DESIGNING AND PRODUCING CUSTOMIZED ADVERTISING BANNERS

This application claims priority under 35 U.S.C. §119(e) to U.S. Provisional Application No. 60/297,947 filed on Jun. 13, 2001, and entitled "A System and Method for Interactively Designing and Producing Customized Advertising Banners" the specification and drawings of which are hereby expressly incorporated by reference.

BACKGROUND OF THE INVENTION

The present invention relates generally to customized display articles, and, more particularly, to a computer-implemented system for interactively designing and producing advertising banners.

Designing and producing commercial artwork, such as advertising banners, has historically been a time consuming and labor intensive process. For instance, a customer would work with an artist or group of artists in an iterative process to design the artistic content for the banner. The customer might put forth various specifications as to what the artistic content should be or how it should appear on the banner. The artist would then interpret the specifications and create an original piece of artwork representing the desired content for the banner. Often the creation of the artwork would involve the aid of computer-implemented design tools. The customer would then examine the artwork and, if unsatisfied, request changes to the artwork. This cycle might be repeated until the artwork adequately reflects the customer's requirements.

Next, the customer would decide on the proper fabrication requirements necessary to produce the banner. For instance, the customer specifies a size and medium for the banner. The artist would then create a properly scaled representation of the artwork in accordance with the fabrication requirements, thereby creating an original custom banner.

Once an original banner was created, duplicate copies of the banner may need to be generated. Prior to generating replicas of the banner, the customer may desire to customize certain aspects of the banner. The conventional design process is not conducive to making such modifications to the design of the banner. Alternatively, the customer may desire to use the same original artwork on different banners.

For instance, a beer distributor prefers that each of its advertising banners display the same company logo. However, if the banners are for use at independently owned retailers, then the banner may also need to display the name of the particular retailer who is displaying the banner. In this case, the customized artwork, such as the company logo, could not be easily replicated for subsequent banners using the conventional design process. In other words, the conventional design process creates unnecessary expense for large commercial customers who desire large quantities of customized banners having similar logos or artwork displayed on each of the banners.

Therefore, it is desirable to provide a computer-implemented system to facilitate interactively designing and producing customized advertising banners.

SUMMARY OF THE INVENTION

In accordance with the present invention, a computer-implemented system is provided for designing and producing customized display articles. The system generally includes at least one user interface, an applications server, a storage medium, a low-resolution graphics engine, a high-resolution graphics engine and an output subsystem. The user interface displays a customizable display article to a customer as well as captures information relating to the customization of the display article from the customer. The storage medium stores the customized data for the display article.

In operation, the applications server manages the customization of the display article. The low-resolution graphics engine builds a low resolution representation of the display article which is displayed on and used to facilitate the customization of the display article at the user interface. After the customer has customized the display article, the high-resolution graphics engine builds a high-resolution representation of the display article which is used by the output subsystem to generate the customized display article onto the appropriate medium.

For a more complete understanding of the invention, its objects and advantages, reference may be had to the following specification and to the accompanying drawings.

BRIEF DESCRIPTION OF THE DRAWINGS

FIG. 1 is a block diagram of a computer-implemented system for interactively designing and producing display articles in accordance with the present invention;

FIGS. 2A–2C illustrate exemplary user interfaces for interactively designing and purchasing a customized banner in accordance with the present invention.

DETAILED DESCRIPTION OF THE PREFERRED EMBODIMENT

Figure 2B:
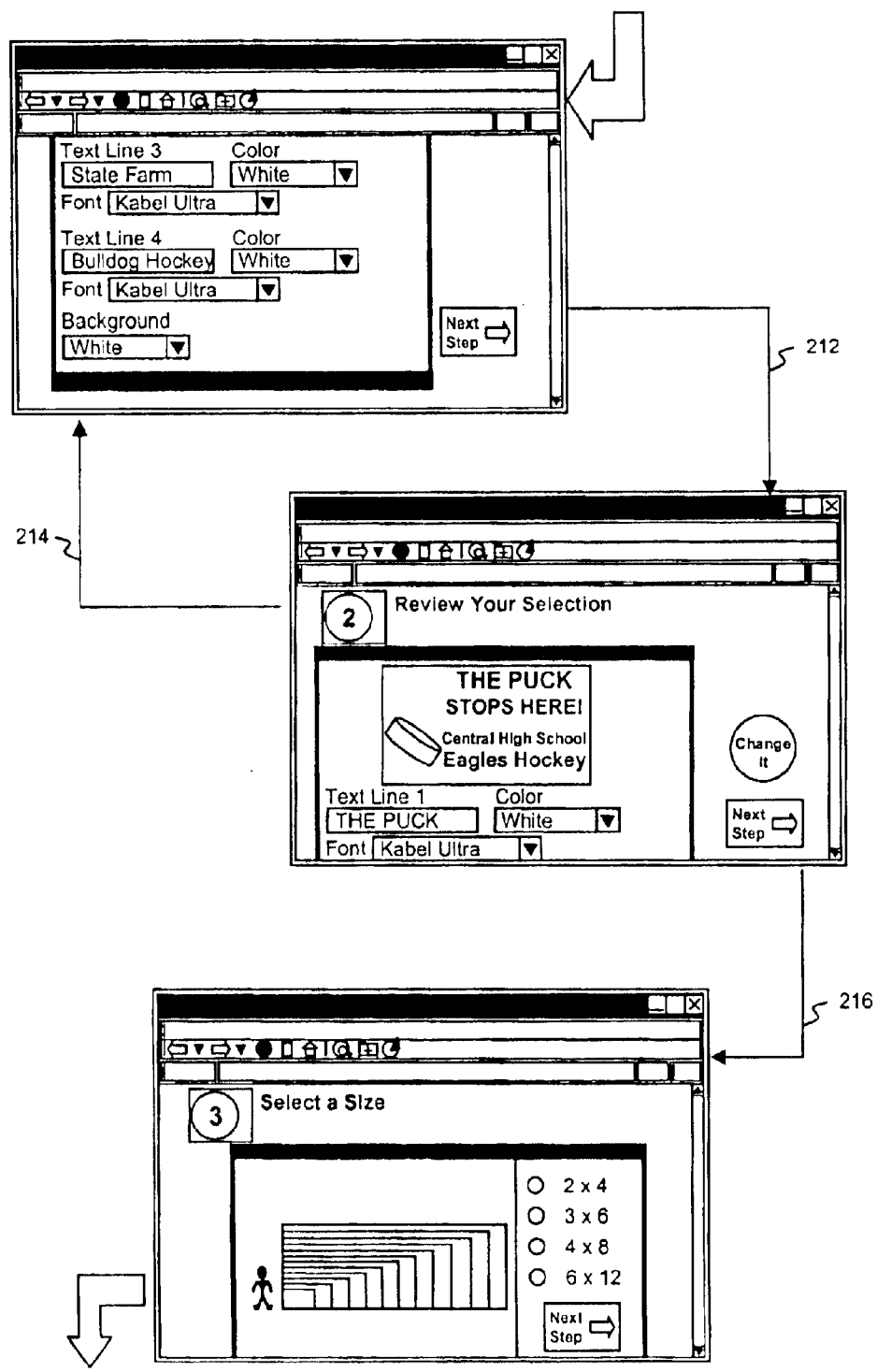

A computer-implemented system 10 for designing and producing customized display articles is depicted in FIG. 1. In a preferred embodiment, the system 10 is used to interactively design advertising banners which are in turn produced on a printable medium. While the following description is provided with reference to advertising banners, it is readily understood that the system may also be used to design and produce other types of display articles.

The system 10 generally includes an user interface 20, an applications server 22, a low-resolution graphics engine 24, a high-resolution graphics engine 26, a storage medium 28 (e.g., a file server) and an output subsystem 30. In a preferred embodiment, the user interface 20 is remotely connected via a computer network 18 (e.g., the Internet) to the applications server 22. The user interface 20 is a web browser application residing on a personal computer. As will be further described below, the web browser application interacts with various web pages hosted by the applications server 22. It is also envisioned that the user interface 20 is directly connected to the applications server 22.

The applications server 22 functions as an interface with the remaining components of the system 10. For instance, the applications server 22 is connected to the low-resolution graphics engine 24. In response to requests to display certain artistic banner content, the low-resolution graphics engine is operable to render low resolution representations of the artistic banner content and communicate it to the user interface 20. The low-resolution graphics engine 24 further includes a storage mechanism for storing low resolution templates for a plurality of customizable banners.

Likewise, the applications server 22 is connected to the high-resolution graphics engine 26. In this case, the high-resolution graphics engine 26 is operable to render high resolution representations of the artistic banner content which are in turn communicated to the output subsystem 30. The high-resolution graphics engine 26 also includes a storage mechanism for storing high resolution templates for a plurality of customizable banners. It is envisioned that the storage mechanism associated with either graphics engine may be independent from or an integrated part of the storage medium 28 accessible to the applications server 22. As will be more fully explained below, the system 10 is used to interactively design and produce customized advertising banners.

In order to design and purchase an advertising banner, a customer may interact with the system as shown in FIGS. 2A–2C. First, the customer enter an applicable domain name at step 202 to retrieve an introductory web page from the applications server 22. The introductory web page may present the customer with a list of banner categories from which a particular type of banner can be chosen. For instance, the introductory web page may relate to custom sports banners and thus provide the user with a list of different sports banner categories, such as football, baseball, hockey, etc. If the customer chooses a banner category, they are brought to another web page that displays each of the different types of available banners associated with that banner category. In this case, the customer has selected the hockey category at step 204, and thus is shown two hockey related banner designs.

Next, the customer can choose a particular banner design at step 206 from amongst the displayed banners. Once the customer has selected a particular banner design, they are given the option of personalizing or customizing the banner (step 208). To do so, the customer is shown a low resolution representation of the banner. The representation is derived from a template for the particular banner.

Each template includes fixed content elements and at least some customizable elements. Fixed content elements may include (but are not limited to) text messages, pictures, logos, and other types of artistic banner content. The fixed content elements are pre-composed and cannot be altered or distorted in any way by the customer.

On the other hand, some aspects of the banner content are customizable by the customer. For instance, the template may allow the customer to edit a pre-composed text message or to enter a new text message which is to be displayed on the banner. Each customizable element may itself be highly customizable. In the case of a text block, the customer may not only edit the text message, but also modify the font style, the size of the font, or the color of the font. It is envisioned that certain templates may be highly customizable whereas other templates will be very tightly controlled. In other instances, modifications permitted to the customizable element may be very tightly controller by the content provider to ensure a certain "look and feel" for the banner. In these instances, the customizable options are limited by the content provider. The customer may also be given the option to change other aspects of the banner content, such as foreground colors, background colors, etc. Various graphical user interface tools allow the customer to make changes to the customizable portions of the banner as is well known in the art.

After the customer has customized the banner, they are then given the option to review the changes they have made to the banner at step 212. A low resolution representation of the banner incorporating the customer's changes is then displayed to the customer (at step 214). If the customer is not satisfied with the banner, additional changes can be made to the banner in the manner described above. This interactive design process may be repeated until the customer is satisfied with the appearance of the banner.

Once the customer approves of or accepts the customized banner design, the customer is prompted to provide additional information relating to the fabrication of an actual banner. For instance, the customer may specify the size of the banner as shown at step 216. Likewise, the customer may specify the material (e.g., vinyl, paper, etc.) upon which to generate the banner. The customer may also specify other fabrication-related features such as trim options, hemming options, grommet option, webbing options, and pole pocket options as shown at step 218. The customer is then shown a low resolution representation of the banner as it will appear in final form including the specified fabrication features (step 220).

At this point, the customer is asked if they would like to purchase the customized banner. If the customer is satisfied with the customized banner, they are navigated through a series of web pages in order to finalize the purchase transaction (step 222). The customer is required to provide various customer information, payment information, and shipping information as is well known in the art.

Returning to FIG. 1, the applications server 22 manages the interactive design and production of the advertising banners. In particular, the applications server 22 interacts with the low-resolution graphics engine to display low resolution representations of the banner to the customer. A plurality of templates for each customizable banner are stored in the database associated with the low-resolution graphics engine 22. In response to a request for a particular banner, the low-resolution graphics engine 22 renders a low resolution representation of the banner based on the stored template and communicates it to the applications server 22. The applications server 22 in turn displays the low resolution representation to the customer. Although it is presently preferred to display a low resolution representation of the banner, high resolution representations may also be suitably used to interactively design a customized banner.

When the customer selects a particular banner, the applications server 22 also creates an order data record for storing information relating to the customer's online transaction. For example, if the customer interactively customizes a banner, the order record is used to store the customized information relating to the banner. The data record may also be used to store customer information, medium information, and fabrication information relating to the customer's transaction. As will be apparent to one skilled in the art, the order record is updated and/or augmented as the customer navigates through the above-described interactive design process. In a preferred embodiment, this data record is stored in a temporary storage medium until the customer's purchase transaction is finalized. The order record can then be stored in a persistent storage medium 28 which is accessible to the applications server 22.

Figure 3:
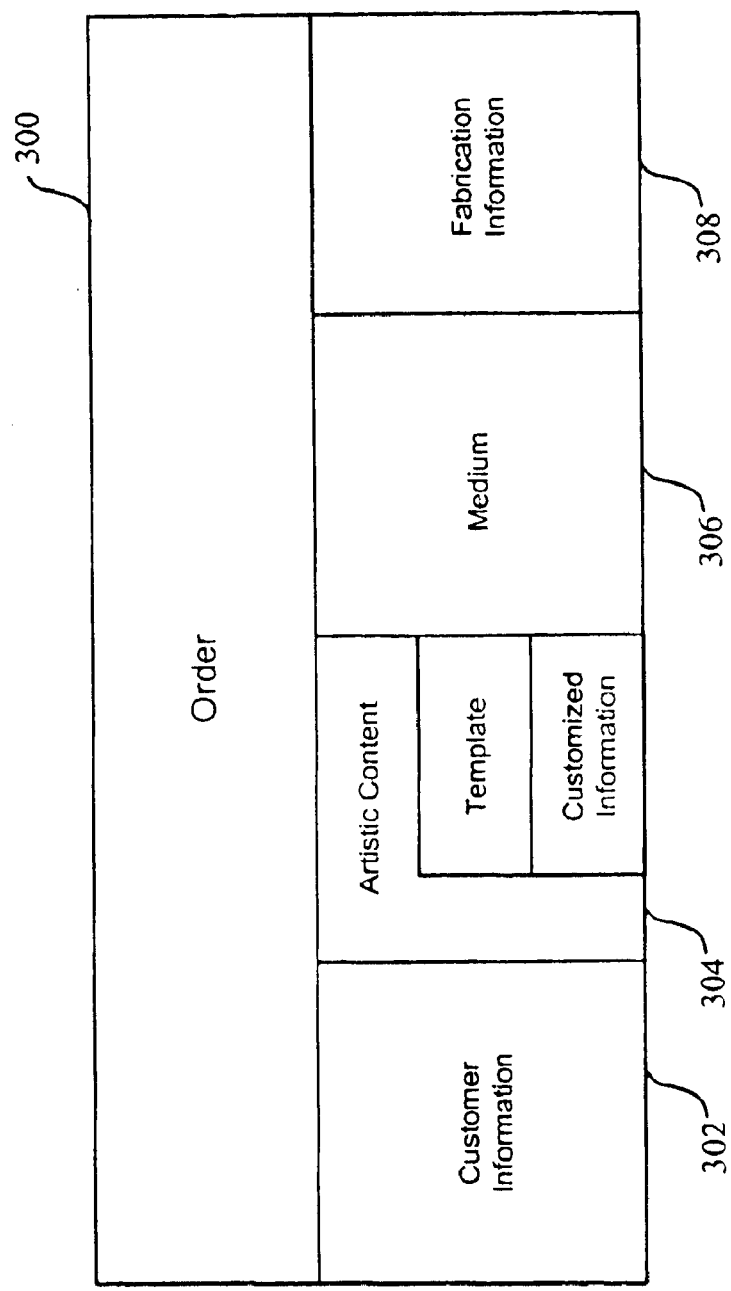
FIG. 3 is a diagram of an order data record in accordance with the present invention.

A preferred embodiment of the order data record is depicted in FIG. 3. The order record 300 contains customer data 302, banner content data 304, banner medium data 306 and banner fabrication data 308. Customer data 302 includes at least a customer identification field, such as a unique customer number or the customer's name. The customer data may also include additional customer identification information (such as the customer's home address, customer's email address, customer's phone number, etc.), order information customer (such as an order number, the order date, purchase price, etc.), payment information (such as credit card type, credit card number, expiration date, etc.) as well as customer shipping information (e.g., delivery method, preferred carrier, shipping address etc.).

The banner content data 304 includes information about the content displayed on the banner. In a preferred embodiment, the banner content data is defined as a reference value or a pointer to the template which serves as the basis for the customized banner. The banner content data may further include the customized data which will be used to augment the pre-defined content associated with template. As will be more further described below, the banner content data is sufficient to allow the customized banner to be reconstructed by the output subsystem. Alternatively, the banner content data may be defined as a graphics file that can be directly sent to a printing device associated with the output subsystem.

Banner medium data provides information about the medium for the customized banner; whereas the banner fabrication data provides information about how to produce the customized banner. It is envisioned that other types of information relevant to placing a customized banner order may also be incorporated into the above-described order record 300. Although a preferred format for the order record has been described, this is not intended as a limitation on the broader aspects of the present invention.

Referring to FIG. 1, the customer initiates fabrication of the customized banner by issuing a command through the user interface 20. The applications server 22 in turn transmits the command to the output subsystem 30. The output subsystem 30 includes an output manager 32 and at least one output device 34. The output manager 32 coordinates the production of customized banners by the output device.

In a preferred embodiment, the output subsystem 30 is remotely located from the remainder of the system. For instance, the output subsystem 30 may be connected across a network 31 to the applications server 22. In this case, the command to generate a banner is transmitted across the network to the output manger 32. More specifically, the command is transmitted in form of the previously described order record embodied in a carrier wave. It is also envisioned that the output subsystem 30 may be directly connected to the remainder of the system 10.

In this preferred embodiment, the high-resolution graphics engine 26 is also connected across the network 31 to the remainder of the system. In response to a request from the applications server 22, the output manager 32 instructs the high-resolution graphics engine to render a high resolution representation of the banner. As noted above, the high-resolution graphics engine 26 includes a storage mechanism for storing high resolution templates for each of the plurality of customizable banners. In other words, each template associated with the low-resolution graphics engine 24 has a corresponding template associated with the high-resolution graphics engine 26. As a result, the order record transmitted to the output manager 32 only needs to include a reference to the applicable template residing in the storage mechanism associated with the high resolution graphics engine 26. The high resolution graphics engine then builds a high resolution representation of the banner using the corresponding high resolution template and augmenting it with any additional customized banner content data as embodied in the order record.

The output manager 32 then coordinates the fabrication of the customized banner. In a preferred embodiment, the output device 34 is further defined as a printer 34. The output manager 32 formulates a print request using the high resolution representation of the banner. In order to properly configure the printing device, the output manager 32 may further configure the print request based on the banner medium and fabrication data embodied in the order record. Lastly, the print request is sent to the printer 34, thereby generating the customized banner.

Although the above-described output subsystem 30 is presently preferred, this is not intended as a limitation of the broader aspects of the present invention. For instance, the order record may merely serve as a visual input to an operator of a more conventional banner fabrication process. In this instance, the user interface of a personnel computer may serve as the output device. In another instance, it is envisioned that the output device may be adapted to output the banners onto a digital media.

While the invention has been described in its presently preferred form, it will be understood that the invention is capable of modification without departing from the spirit of the invention as set forth in the appended claims.

What is claimed is:

1. A computer-implemented system for designing and producing customized display articles, the system comprising:

a user interface for displaying a customizable display article having pre-composed artistic display content and customizable display content data, the user interface operable to capture and edit customized display content data for the display article from a system operator;

an applications server connected to the user interface for managing the customization of the display article;

a storage medium connected to the applications server for storing the customized display content data for the display article;

a low-resolution graphics engine connected to the applications server and to the storage medium, the low-resolution graphics engine operable to build a low resolution representation of the display article and to transmit the low resolution representation of the display article to the user interface, where the low resolution representation of the display article is in part based on customized display content data stored in the storage medium;

an output subsystem connected to the applications server for producing the customized display article; and a high-resolution graphics engine connected to the applications server and the output subsystem, the high-resolution graphics engine operable to build a high-resolution representation of the display article and transmit the high resolution representation of the display article to the output subsystem, where the high resolution representation of the display article is in part based on customized display data stored in the storage medium.

2. The computer-implemented system of claim 1 wherein the customized display article is further defined as an advertising banner.

3. The computer-implemented system of claim 1 wherein the user interface is remotely connected via a computer network to the applications server and the applications server is adapted to interact over the computer network with the user interface.

4. The computer-implemented system of claim 3 wherein the user interface is further defined as a web browser residing on a personal computing device.

5. The computer-implemented system of claim 1 further comprises a first graphics storage mechanism associated with the low resolution graphics engine for storing pre-composed, low resolution data files for a plurality of customizable display articles, such that the low resolution representation of the display article is based on the corresponding low resolution data file in the first graphics storage mechanism.

6. The computer-implemented system of claim 1 further comprises a second graphics storage mechanism associated with the high resolution graphics engine for storing pre-composed, high resolution data files for a plurality of customizable display articles, such that the high resolution representation of the display article is based on the corresponding high resolution data file in the second graphics storage mechanism.

7. The computer-implemented system of claim 1 wherein the high resolution representation of the display article is transmitted via an order record to the output subsystem, such that the order record includes customer data for identifying the customer ordering the display article, content data for constructing the artistic content displayed on the display article, medium data for defining the medium of the display article, and fabrication data defining how to produce the display article.

8. The computer-implemented system of claim 7 wherein the content data of the order record is further defined as a template identification field that identifies a pre-composed artistic content template for the display article and the customized content data for augmenting the artistic content template for the display article.

9. The computer-implemented system of claim 1 wherein the output subsystem is further defined as a printing device, wherein the printing device is operable to print the high resolution representation of the display article onto a given medium, thereby producing the customized display article.

10. A computer-implemented system for generating customized advertising banners, comprising:

a user interface operable to display at least one customizable banner to a system user and to capture and edit customized display content data relating to the customizable banner input by the system user, the banner having pre-composed artistic display content and customizable display content data;

a data structure for storing the customized display content data relating to the customizable banner;

a first graphics engine in data communication with the user interface and the data structure, the first graphics engine is operable to render a low resolution representation of the customizable banner and to communicate the low resolution representation of the customizable banner to the user interface, where the low resolution representation of the banner includes the customized display content data stored in the data structure;

a printing device for generating customizable banners; and a second graphics engine in data communication with the user interface and the data structure, the second graphics engine is operable to render a high resolution representation of the customizable banner and to communicate the high resolution representation of the customizable banner to the printing device, where the high resolution representation of the banner includes the customized display content data stored in the data structure.

11. A data record for ordering a display article, the data record embodied in a carrier wave, comprising:

customer data that stores information about a customer that is ordering the display article;

content data that stores information about artistic content on the display article;

medium data that stores information about a medium for the display article; and fabrication data that stores information about how to generate the display article, wherein the fabrication data includes at least one datum selected from the group consisting of hem information, grommet information, sewn in rope information, sewn in webbing information, and pole pockets information.

12. The data record of claim 11 wherein the content data is further defined as a template identification field that identifies a pre-composed artistic content template for the display article.

13. The data record of claim 12 wherein the content data is further defined to include customizable display data for augmenting the artistic content template for the display article.

14. The data record of claim 13 wherein the customizable display data includes information for one or more customizable elements associated with the artistic content template, where each customizable element is defined by an element type, an element text block, an element text font, and an element color.

* * * * *